US012473761B2

(12) United States Patent
McCutchan, Jr.

(10) Patent No.: US 12,473,761 B2
(45) Date of Patent: Nov. 18, 2025

(54) PRESSURE-RELEASE LATCH WITH TENSION CALIBRATION

(71) Applicant: QRP, Inc., Berea, OH (US)

(72) Inventor: Ben Ona McCutchan, Jr., Statesville, NC (US)

(73) Assignee: QRP, Inc., Berea, OH (US)

(*) Notice: Subject to any disclaimer, the term of this patent is extended or adjusted under 35 U.S.C. 154(b) by 273 days.

(21) Appl. No.: 18/099,235

(22) Filed: Jan. 19, 2023

(65) Prior Publication Data

US 2024/0247524 A1 Jul. 25, 2024

(51) Int. Cl.
*E05C 19/02* (2006.01)
*E05C 3/14* (2006.01)

(52) U.S. Cl.
CPC ................ *E05C 19/02* (2013.01); *E05C 3/14* (2013.01)

(58) Field of Classification Search
CPC .. Y10T 292/216; Y10S 292/31; Y10S 292/49; E05C 19/02; E05C 3/14
See application file for complete search history.

(56) References Cited

U.S. PATENT DOCUMENTS 6,343,815 B1 * 2/2002 Poe ....................... E05C 19/145 292/DIG. 31
8,371,626 B2 * 2/2013 Huston ................... E05C 1/065 292/164
8,740,147 B2 * 6/2014 Defrance ............... B64D 29/06 244/129.4
8,919,829 B2 * 12/2014 Hernandez ............ E05B 51/023 292/228
9,169,678 B2 * 10/2015 Rozema ................ E05B 51/023
10,352,074 B2 * 7/2019 Hernandez ............. B64D 29/06
10,378,256 B2 * 8/2019 Do ......................... B64D 29/08
10,604,977 B2 * 3/2020 Do .......................... E05B 15/04
11,433,764 B2 * 9/2022 Noda .................... E05F 15/611
2002/0195827 A1 12/2002 Jackson et al.

(Continued)

FOREIGN PATENT DOCUMENTS

CN 104929455 A 9/2015
CN 106639699 A 5/2017
CN 111328360 A 6/2020

OTHER PUBLICATIONS

Extended Search Report mailed Jun. 10, 2024, in corresponding European Application No. 24152183.0.

*Primary Examiner* — Kristina R Fulton
*Assistant Examiner* — Noah Horowitz
(74) *Attorney, Agent, or Firm* — Harness, Dickey & Pierce, P.L.C.

(57) ABSTRACT

A pressure-release latch for releasably locking closed a door panel on the frame to which the door panel is hingedly connected. The latch has a base and a latch bolt rotatable between a closed position that locks the door panel closed and an open position that allows the door to swing open. A latch bolt actuator connected to the latch bolt rotates the latch bolt between the closed and open positions from outside the door panel, locks the latch bolt in the closed position, and automatically unlocks and moves the latch bolt to the open position when a predetermined opening force is applied to the latch bolt. A calibration mechanism adjusts the magnitude of the predetermined opening force required to automatically unlock the latch.

20 Claims, 9 Drawing Sheets

(56) References Cited

U.S. PATENT DOCUMENTS

| | | | | |
|---|---|---|---|---|
| 2014/0035296 | A1* | 2/2014 | Jackson | E05C 19/02 292/194 |
| 2020/0095806 | A1* | 3/2020 | Diaz | E05B 51/023 |
| 2021/0010291 | A1 | 1/2021 | Manly et al. | |

* cited by examiner

PRESSURE-RELEASE LATCH WITH TENSION CALIBRATION

FIELD OF THE INVENTION

The invention relates to the field of blowout or pressure release latches for holding closed a moveable access panel on any structure. More specifically, the invention relates to an aircraft, pressure-release latch having a calibration mechanism that adjusts the level of pressure needed to automatically open the latch.

BACKGROUND OF THE INVENTION

A pressure release latch is a type of latch that is used to secure access panels on land vehicles, aircraft, or other structures that may experience an excessive buildup of pressure within the compartment enclosed by the door panel. Pressure release latches have many applications but are commonly used to secure the access panels of an aircraft's engine housing. When a predetermined, excessive level of pressure ("blowout force") builds up inside the engine housing, the latches are designed to automatically unlock/open, which enables the door panel to pop open to avoid damaging the door panel, surrounding aircraft housing or frame, or components within the compartment. Prior art pressure-release latches typically also include a manual actuator that can be used to open the door panel from the outside in order to service components within the compartment.

Prior art pressure-release latches are typically complicated and heavy, which is especially undesirable for aerospace application. Therefore, there is a need for a lighter and more compact pressure-release latch than provided in the prior art.

Additionally, prior art pressure-release latches typically use torsion springs to create their latch locking force, and do not have the ability to adjust the torsion force created by those springs when the latch is assembled. Because torsion springs have a large variability in bias properties even within the same lot or successive lots, the manufacturer must swap out torsion springs when the completed assembly does not perform as required, i.e., open at a required blowout force. Therefore, there is also a need for a pressure-release latch that has opening force calibration means to accommodate the variability of torsion force tolerances of the springs used in their manufacture.

SUMMARY OF THE INVENTION

The invention comprises a pressure release latch that is more compact, efficient, and lightweight than prior art pressure release latches. The novel pressure release latch also includes means for adjusting the opening force required to unlock the latch and open the door panel. The novel pressure release latch can be manually opened from outside the door panel by pulling an actuator arm, which has high visibility when positioned in the unlocked/open position even if the door panel appears to be closed.

In preferred embodiments, the pressure release latch mounts to the inside of a door panel near the free-swinging edge of the door panel that can only rotate outwardly. The latch includes a latch bolt that is movable between open and closed positions by an actuator. In the closed position, the actuator locks the latch bolt in place with a latch bolt head abutting the inside surface of the frame surrounding the door panel so that the door panel cannot rotate outwardly. When excessive pressure on the inside of the door panel creates an opening force on the latch bolt that exceeds a predetermined opening force, the actuator automatically unlocks and moves the latch bolt to the open position, which retracts the latch head from contact with the door frame so that the door panel can open and relieve the internal pressure.

In one preferred embodiment, the latch bolt is pivotally mounted to a latch base and is restrained at one end by a spring-biased, toggle-linkage tensioner. In accordance with the mechanical advantage/leverage of the toggle-linkage tensioner in various configurations, the latch bolt releases soon after the rotational force exerted on the latch head created by the blowout force exceeds an opposed, pre-designed, rotational restraining force exerted on the shank end of the latch bolt by the toggle-linkage tensioner. This "latch opening force" on the toggle linkage is selected during assembly by adjusting the degree of deflection (pre-loaded bias) of the toggle-linkage spring. When that condition occurs, the toggle-linkage tensioner will have deflected its bias spring and rotated to a configuration where the angular orientation of its links relative to one another and the latch bolt itself no longer exert enough mechanical leverage on the latch bolt shank to keep the latch bolt from rotating to the open position. Thereafter the bolt is free to continue rotation to a more fully open position.

In preferred embodiments, the bias force exerted by the spring on the toggle linkage can be calibrated/adjusted to modify the latch opening force. In one preferred embodiment, the spring comprises a torsion spring and the bias force is adjusted by changing the amount of pre-tension (angle of deflection from its free position) in the torsion spring. Preferably, the pre-tension can be adjusted in a range of plus or minus fifteen percent. Because of this adjustment feature, the latch opening force can be calibrated to meet specific latch opening force specifications without disassembling the latch and replacing the torsion spring as is typical with prior art pressure-release latches.

In one preferred embodiment, the pressure release latch releasably locks closed a door panel on the frame to which the door panel is hingedly connected. The latch housing has a proximal end, distal end, top side, bottom side, a central aperture, and means for mounting the bottom side of the housing to the door panel. Preferably, the mounting means comprises a plurality of opposed, mounting tabs. Each tab has an aperture through which a fastener is inserted to mount the latch on the inner surface of the door panel.

The latch includes a latch bolt having an elongate shank with a distal end, proximal end, and a head formed on the proximal end. The shank of the latch bolt is mounted by a first pivot pin to the top side of the base near the proximal end of the housing. The latch bolt is rotatable between a closed position that locks the door panel closed and an open position that allows the door to swing open. The head of the latch bolt abuts the frame when the latch bolt is oriented in the closed position.

A latch bolt actuator is mounted by a second pivot pin to the top side of the base near the distal end of the housing and is connected to the shank of the latch bolt. The actuator preferably includes means for manually rotating the latch bolt between the closed and open positions from outside the door panel. In a preferred embodiment, the manual rotating means comprises an actuator arm connected to the shank of the latch bolt between the distal end of the shank and the first pivot pin. The actuator arm extends from the shank through the central aperture in the base. The actuator arm has a head formed at its free end that seats flush within the outer surface of the door panel when the latch is in the closed position, and extends outwardly from the door panel when the latch is in the open position so that a technician can more readily recognize that the latch is open even when the door appears to be shut.

The latch bolt actuator also includes means for locking the latch bolt in the closed position, and means for means for automatically unlocking and moving the latch bolt to the open position when a predetermined opening force is applied to the latch bolt. In one preferred embodiment, the latch bolt actuator comprises a spring-biased, toggle-linkage tensioner pivotally mounted at one end by a second pivot pin to the distal end of the housing and pivotally connected at the other end to the bolt shank. The linkage locks the latch bolt in the closed position, and automatically unlocks and moves the latch bolt to the open position when a predetermined opening force is applied to the latch bolt.

In one preferred embodiment, the spring-biased, toggle-linkage tensioner comprises a restraining arm, a lever arm, and a spring. The restraining arm has a distal end, and a proximal end pivotally connected to the latch bolt shank by a first linkage pin. The lever arm has a proximal end pivotally connected to the distal end of the restraining arm by a second linkage pin, and a distal end pivotally mounted to the second pivot pin. The spring biases the lever arm and restraining arm towards the head of the latch bolt. Preferably, the spring comprises at least one coil spring wound around the second pivot pin and has first and second protruding legs. The first leg sits in contact with at least one of the linkage pins when the latch is oriented in at least the closed position. In preferred embodiments, the tensioner includes a pair of restraining arms mounted on opposed sides of the lever arm and the latch bolt. The latch may also include a second torsion spring wrapped around the first pivot pin that biases the latch bolt toward the open position.

The latch has means for calibrating the magnitude of the predetermined opening force required to automatically release the locking means. Preferably, the calibrating means comprises a screw mechanism that changes the degree of deflection of the coil spring of the tensioner when the latch is oriented in the closed position. In one preferred embodiment, the screw mechanism comprises a calibration screw and a capture slot formed in a hinge bracket that houses the second pivot pin. The calibration screw can be extended into and retracted from the capture slot. The second leg of the coil spring sits in the capture slot in contact with the adjustment screw so that movement of the calibration screw within the capture slot changes the degree of deflection of the coil spring and the force it exerts on the toggle linkage.

The first pivot pin and the second linkage pin define an over-center axis. The toggle linkage is arranged so that the first linkage pin is out of alignment with the over-center axis when the latch is in the closed position. In operation, the latch bolt moves to the open position when the force on the latch bolt rotates the latch bolt and urges the toggle linkage from an angular configuration to a linear configuration aligned with the over-center axis, and then to an opposed angular configuration. The first linkage pin rotates past the over-center axis to move the latch from the closed position to the open position when the predetermined opening force is exceeded. The toggle linkage is constructed so that rotation of the first linkage pin past the over-center axis releases all restraining force of the toggle linkage on the latch bolt.

DESCRIPTION OF THE PREFERRED EMBODIMENTS

Figure 1:
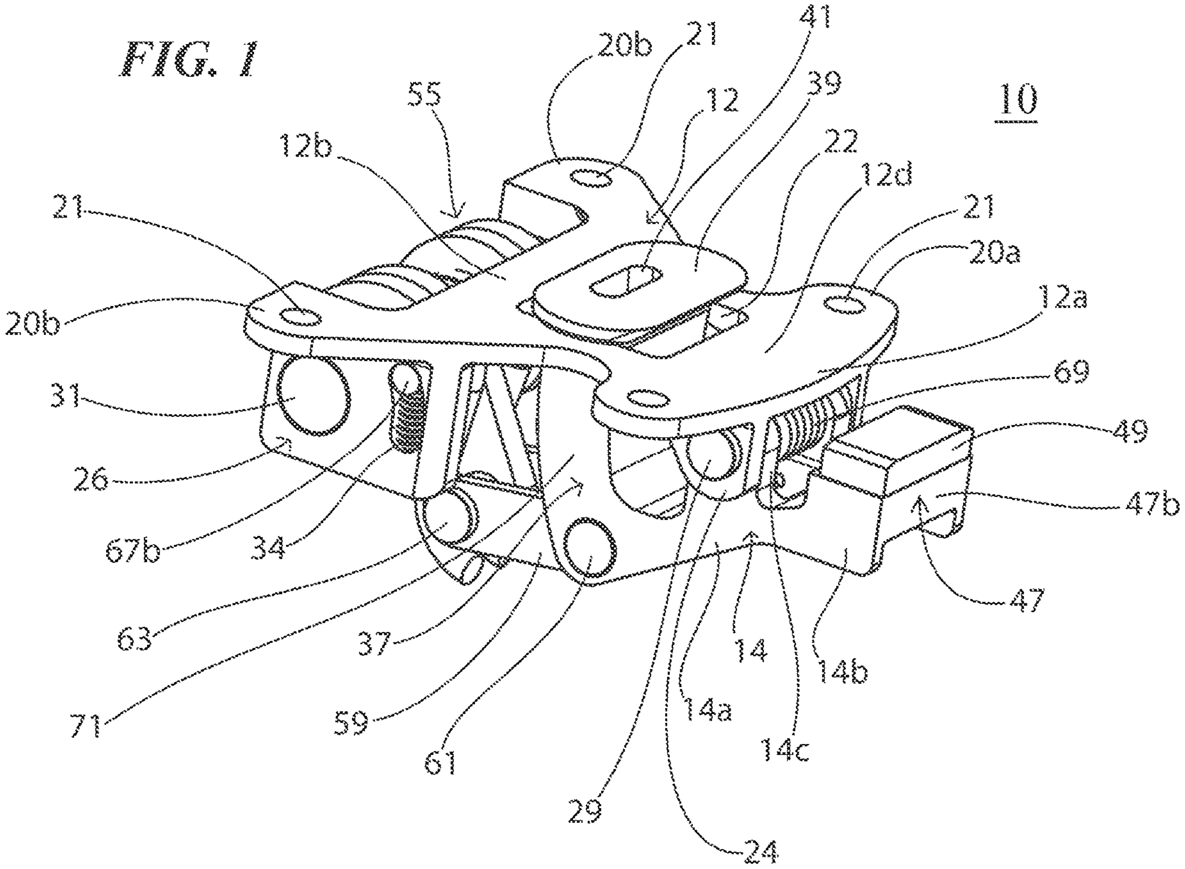
FIG. 1 is a bottom perspective view of a pressure-release latch in accordance with a preferred embodiment of the invention.
Figure 2:
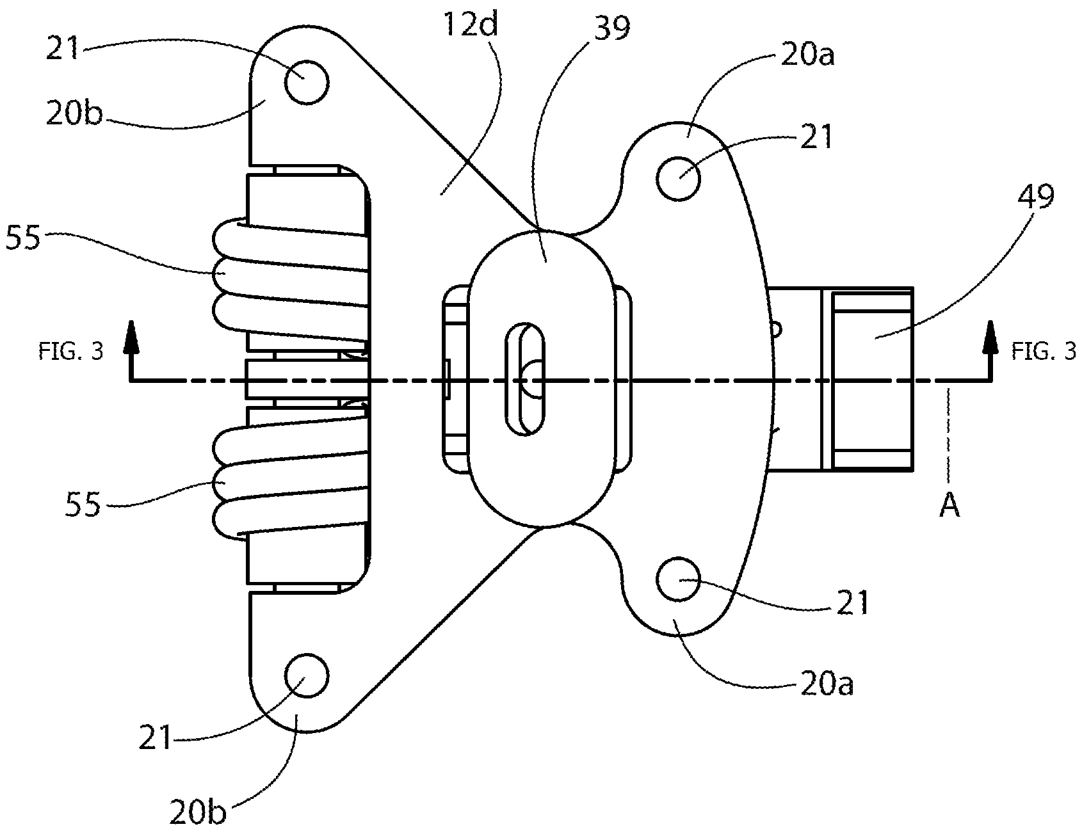
FIG. 2 is bottom plan view of the pressure-release latch of FIG. 1.

For the purpose of illustrating the invention, several embodiments of the invention are described with respect to the accompanying drawings. However, it should be understood by those of ordinary skill in the art that the invention is not limited to the precise arrangements and instrumentalities shown therein and described below. Throughout the specification, like reference numerals are used to designate like elements.

A latch in accordance with preferred embodiments of the invention is shown in FIGS. 1-7*c* and is designated generally by reference numeral 10. The latch 10 is shown oriented horizontally in FIGS. 3 and 7*a*-*c* for use with, and installed on, a generally-horizontally-oriented door panel "DP" of an aircraft. The door panel DP covers an access port in the aircraft frame AF such as the engine housing. However, it should be understood that the latch 10 can be used with a door panel DP having any orientation, including a vertical orientation.

Figure 7A:
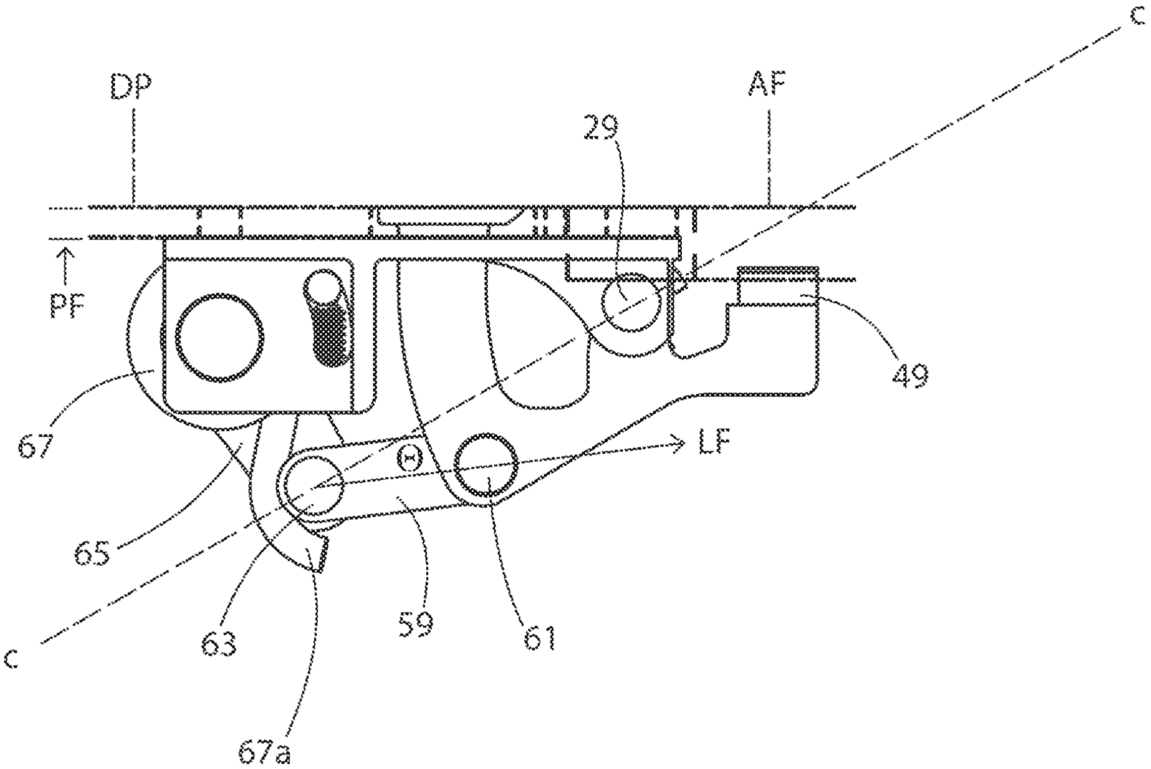
Figure 7B:
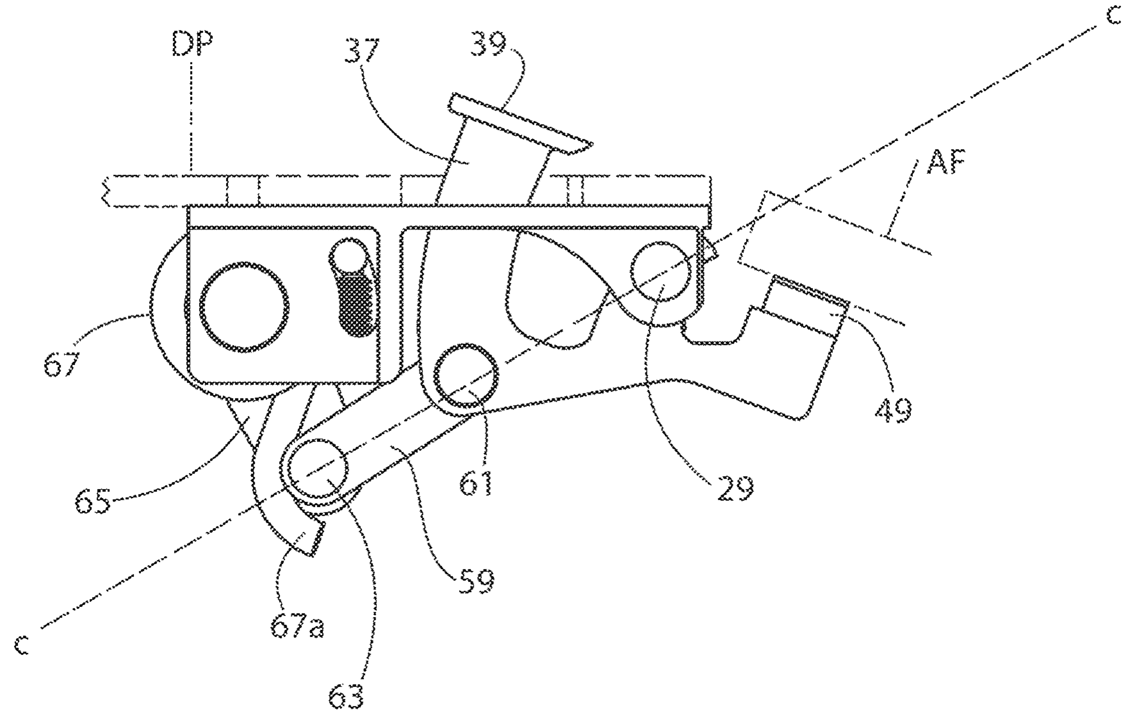
Figure 7C:
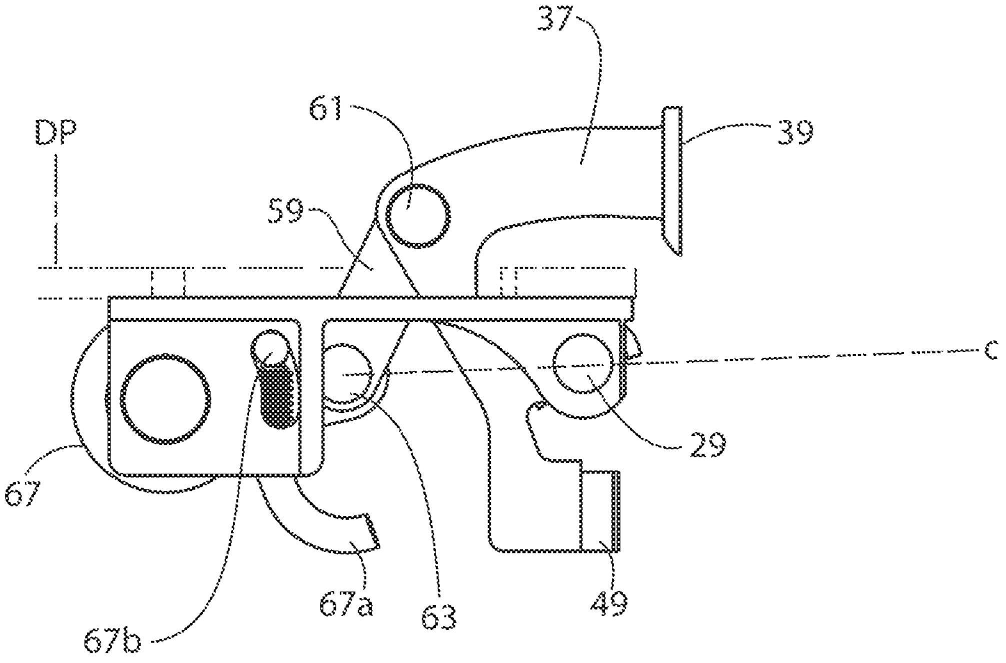

The latch 10 is operable between a closed position such as shown in FIGS. 1-4, 6 and 7*a*, intermediate positions such as shown in FIG. 7*b*, and a fully-open position such as shown in FIG. 7*c* to provide temporary access through the access port. In preferred embodiments, the latch 10 has a symmetrical construction about a central axis "A" shown in FIG. 2. For this reason, the latch 10 is illustrated from only one side in FIGS. 1-7. Along the central axis A, the reference point for the terms "proximal" and "distal" is the head 14*b* of the bolt 14, which abuts the aircraft frame AF when the latch 10 is closed.

The latch 10 generally includes a base 12, a pivotable latch bolt 14, and a bias-adjustable bolt actuator, generally designated by reference numeral 16. In preferred embodiments, the lock bolt 14 is pivotally connected to the proximal end 12*a* of the base 12, while the bolt actuator 16 is mounted on the distal end 12*b* of the base 12. As described in greater detail below, the bolt actuator 16 performs multiple functions. First, it moves the latch bolt 14 between open and closed positions by application of a manual force to the manual actuator arm 37 described below. Second, it locks the latch bolt 14 in the closed position with sufficient force so that the door panel DP does not open during normal flight conditions. Third, it unlocks and moves the latch bolt 14 from the closed position to the open position when a predetermined opening force is applied to the interior of door panel DP usually caused by an excessive build-up of pressure inside the aircraft housing.

In the embodiment shown in FIGS. 1-7*c*, the base 12 has a generally-planar, irregular shape including opposed, proximal mounting tabs 20*a*, opposed, distal mounting tabs 20*b*, a central aperture 22, a top side 12*c*, and a bottom side 12*d*. Because the latch 10 can be utilized on door panels DP having a variety of orientations, the term bottom side 12*d* refers to the side of the base 12 that abuts the door panel DP when the latch 10 is fastened thereto, while the top side 12*c* refers to the opposite side to which the several structural elements of the latch 10 are mounted. Each tab 20*a*, 20*b* has an aperture 21 through which a fastener (not shown) is inserted to mount the latch 10 on the inner surface of the door panel DP as shown in FIG. 7*a*.

The door panel DP is pivotally connected to the aircraft frame AF by one or more hinges (not shown) at a hinged end so that the opposed latch end of the door panel can swing between open and closed positions. In preferred embodiments, the latch 10 is mounted close enough to the latch end of the door panel DP so that the head 14*b* of the latch bolt 14 can engage and abut the inner surface of the aircraft frame AF surrounding the door panel and prevent the door panel DP from opening until a predetermined internal air pressure is exceeded or the latch is intentionally opened by an operator. In the embodiment shown in FIGS. 7*a-c*, the door panel DP can only swing outwardly from its closed position relative to the aircraft frame AF; however, it should be appreciated by those of ordinary skill in the art that the latch 10 would work similarly and just as effectively if mounted on the outside of a door panel that is only capable of swinging inwardly if an excessive negative pressure built up in the inside of the door panel DP.

Figure 3:
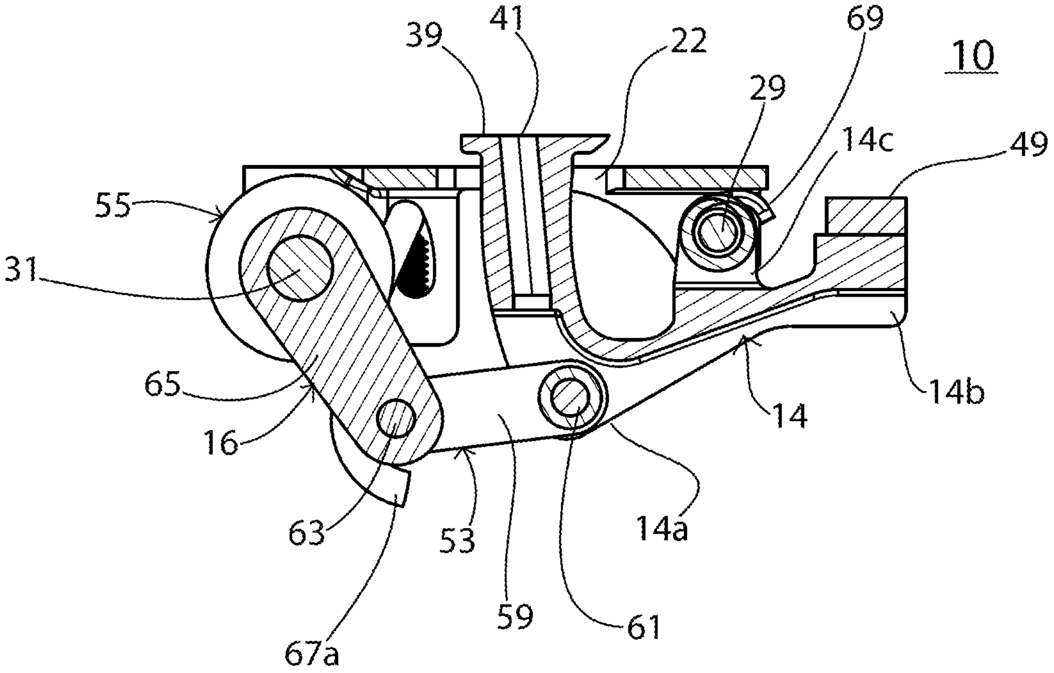
FIG. 3 is a cross-section taken along lines 3-3 of FIG. 2.
Figure 4:
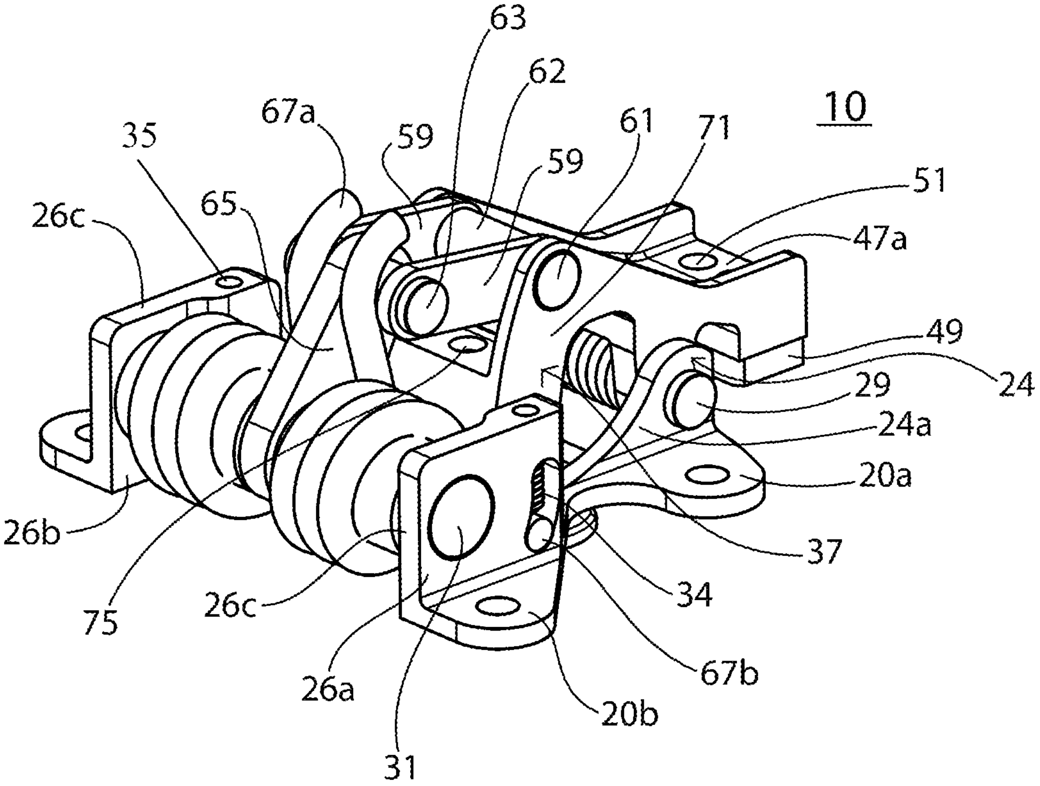
FIG. 4 is a top perspective view of the pressure-release latch of FIG. 1.
Figure 5:
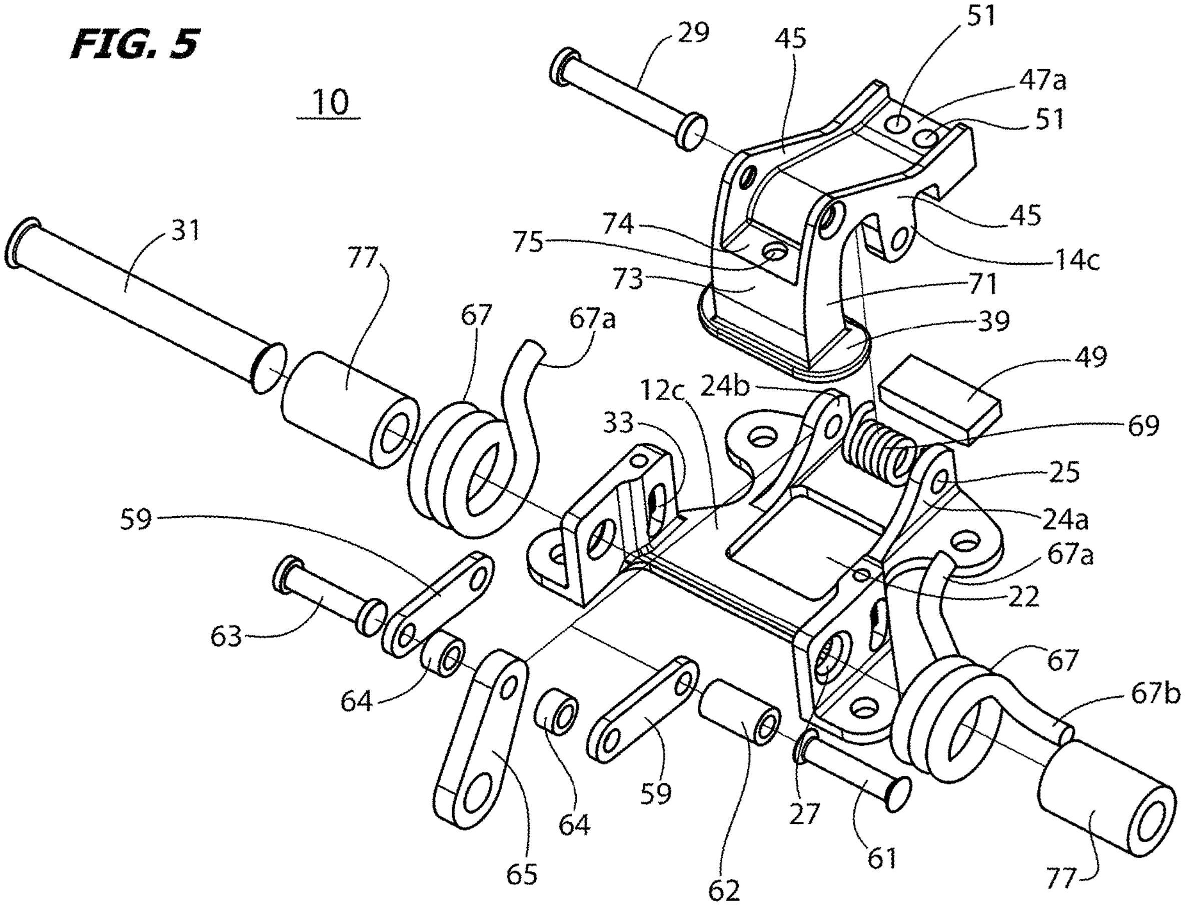
FIG. 5 is an assembly view of the pressure-release latch of FIG. 1.
Figure 6:
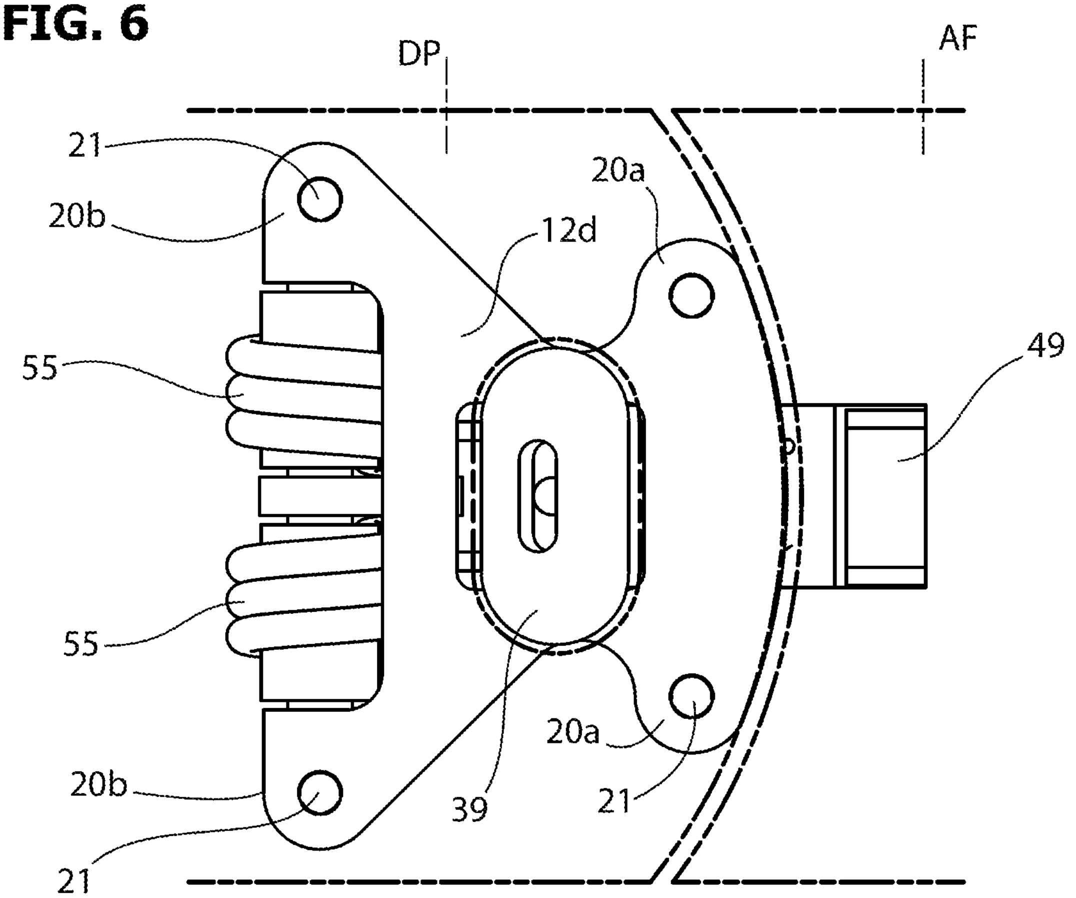
FIG. 6 is a bottom plan view of the pressure-release latch of FIG. 1 installed on a door panel of an aircraft frame; and, FIGS. 7*a*-*c* are sequential side elevations of the pressure-release latch in closed, partially-open and fully-open configurations, respectively.

Referring to FIGS. 4 and 5, the base 12 includes a pair of opposed, proximal hinge brackets 24 and distal hinge brackets 26, both of which are fixed to and project from the top side 12*c*. The brackets 24, 26 have opposed outer planar surfaces 24*a*, 26*a* and opposed inner planar surfaces 24*b*, 26*b*, which extend transverse to the plane of the top side 12*c* of the base 12. The brackets 24, 26 have a circular bore 25, 27, respectively, extending through the planar surfaces of the brackets 24, 26 and having a central axis extending transverse to the planar surfaces 24*a*, 24*b* and 26*a*, 26*b*, respectively, and generally parallel to the plane of the top side 12*c* of the base 12. Each bore 25, 27 supports the ends of a proximal and distal pivot pin 29, 31, respectively, as described below. Each of the distal brackets 26 has a spring capture slot 33 extending through the planar surfaces 26*a*, 26*b*, and a threaded bore 35 extending from the edge surfaces 26*c* of the bracket 26 to the spring capture slot 33. A calibration screw 34 engages the threaded bore 35 and is long enough so that a portion extends into the spring capture slot 33 as best seen in FIGS. 3 and 4.

In the embodiment shown in FIGS. 1-7*c*, the central aperture 22 in the base 12 has a generally-square shape having dimensions slightly larger than the head 39 of a manual actuator arm 37 (described below), which is used to lock the latch 10 by depressing the head 39 with force sufficient to overcome the locking force of the bolt actuator 16, or open the latch 10 by prying the head 39 outwardly using a tool, such as a flathead screwdriver, inserted in a slot 41 formed in the head 39.

Referring to FIGS. 1 and 3, the latch bolt 14 has an elongate shank 14*a* with an integrally-formed head 14*b* at the proximal end, and integrally-formed hinge brackets 14*c* in the middle for attachment to the proximal pivot pin 29 and proximal hinge brackets 24. In a preferred embodiment shown in FIGS. 1-7*c*, the latch bolt 14 is formed from a pair of distally-spaced plates 45 oriented parallel to one another, and a pair of transversely-extending struts 47*a*, 47*b* fixed to the proximal ends of the parallel plates 45. In the embodiment shown in FIGS. 1-7*c*, the struts 47*a*, 47*b* have the form of rectangular plates, one or more of which may be integrally formed with the parallel plates 45 or fastened to the plates 45 using welding or other attachment means. When the bolt 14 is configured in the closed position, one strut 47*a* is aligned in a plane generally parallel to the plane of the base 12, while the second strut 47*b* is aligned generally transverse to the plane of the base 12. In preferred embodiments, a bumper 49 is fixed to the first strut 47*a* and is preferably made from an elastomeric material. In this preferred embodiment, the bumper 49 is affixed to the first strut 47*a* by fasteners that extend through bores 51 in the first strut 47*a*. As described below, the bumper 49 abuts the aircraft frame AF when the latch is closed and, because it is elastomeric, the bumper 49 compresses to accommodate a small amount of deviation in the thickness of the aircraft frame AF.

The distal end of the bolt shank 14*a* is connected to the bolt actuator 16. In one preferred embodiment, the bolt actuator 16 comprises a toggle linkage, designated generally by reference numeral 53, a linkage tensioner designated generally 55, and the manual actuator arm 37. In one preferred embodiment, the toggle linkage 53 comprises a first link pivotally connected to the distal end of the bolt shank 14*a* and a second link pivotally connected to the distal end of the base 12. The links are pivotally connected to one another.

As best seen in FIG. 4, the first link comprises a pair of opposed restraining arms 59, each of which is pivotally connected the distal end of the latch shank 14*a* by a first linkage pin 61 and separated by a spacer 62. The second link comprises a lever arm 65, which is pivotally connected at one end to the restraining arms 59 by a second linkage pin 63 and is centrally located between the restraining arms 59 by a pair of spacers 64. The other end of the lever arm 65 is pivotally connected to the base 12 by the distal pivot pin 31. Alignment of the restraining arms 59 and lever arm 65 is important for creating proper force transmission through the latch 10.

In a preferred embodiment, the manual actuator arm 37 is integrally formed with the bolt shank 14*a*. In this embodiment, the manual actuator arm 37 comprises a pair of plate extensions 71 of the parallel bolt plates 45, which are co-planar with the bolt plates 45 but extend transversely to the length of the bolt shank 14*a* as best seen in FIGS. 1 and 3.

Referring to FIG. 5, a plurality of transverse side struts 73 and a transverse bottom strut 74 (relative to the orientation shown in FIG. 1) extend between and join the plate extensions 71. The actuator head 39 is fixed to the ends of the plate extensions 71. Application of a force to the head 39, either in depression or retraction, causes the latch bolt 14 to rotate about the proximal pivot pin 29. An elongated slot 41 is formed in the head 39, which is constructed to receive the head of a work tool to retract the head 39 by prying. Preferably, the slot 41 extends through the head so that any condensation that forms in the slot 41 will drain through the slot and through a drain hole 75 in the bottom strut 74. As used in this paragraph, “transverse” refers to a direction relative to the plane of the plate extensions 71.

Those of ordinary skill in the art should appreciate that the manual actuator arm 37 need not be integrally formed with the bolt shank so long as its construction can exert a rotational force on the latch bolt 14 sufficient to overcome the locking force of the toggle linkage 53. For example, the plate extensions 71 could comprise separate structural elements pivotally connected to the proximal pivot pin 29, or separate structural elements pivotally connected to the bolt shank 14*a* at a location different than the pivot pin 29.

In this preferred embodiment, the manual actuator arm 37 is long enough so that the head 39 extends through the central aperture 22 in the base 12 and sits higher than the base 12 as best seen in FIG. 3. This spatial differential allows the head 39 to sit flush with the outer surface of the door panel DP within a cutout in the door panel as best seen in FIG. 7*a*.

In a preferred embodiment shown in FIGS. 1-7*c*, the linkage tensioner 55 comprises a pair of torsion coil springs 67 surrounding the distal housing pivot pin 31 on opposed sides of the lever arm 65. Each coil spring 67 has a pair of legs 67*a*, 67*b*. For easier rotation, the coil springs 67 are seated on bushings 77 surrounding the distal pivot pin 31 as best seen in FIG. 5. The first leg 67*a* engages the spacers 64 on the second linkage pin 63 that surround the lever arm 65. The second leg 67*b* is seated in the spring capture slot 33 of its respectively-adjacent distal hinge bracket 26. When the latch is oriented in the closed position, the first legs 67*a* exert a predetermined force on the latch bolt 14 based on the degree of deflection of the springs 67 from their free position.

The linkage tensioner 55 includes a mechanism for calibrating the tension exerted by the coil springs 67. In one preferred embodiment, the calibration mechanism adjusts the tension by changing the degree of rotation of the springs when they are preloaded. In this embodiment, the calibration mechanism comprises the spring capture slot 33 and the calibration screw 34. The capture slot 33 is longer than the diameter of the first leg 67*a* to allow movement/position adjustment along the length of the slot 33. In the closed position, each spring 67 is deflected in the clockwise direction (relative to the image shown in FIG. 3) from its free position so that the second leg 67*b* is biased in a downward direction (relative to the image shown in FIG. 3) until it contacts the calibration screw 34. The torsional bias force of the second leg 67*b* on the second linkage pin 63 is adjusted by extending or retracting the portion of the calibration screw 34 that extends into the capture slot 33, which causes the degree of deflection of the torsion spring 67 to increase or decrease, respectively. In the embodiment shown in FIGS. 1-7*c*, the torsion spring bias force is increased by extending the calibration screw 34 into the capture slot 33 and pushing the base end 67*a* of the spring 67 toward the bottom of the slot 33. In contrast, the torsional spring force is reduced by retracting the calibration screw 34 and allowing the base end 67*a* of the spring 67 to move toward the top of the slot 33.

Preferably, a second torsion spring 69 is mounted on and surrounds the proximal base hinge pin 29. One leg of the spring 69 abuts the bolt shank 14*a* while the other abuts the base 12. The second torsion spring 69 is oriented so that it normally urges the latch bolt toward the open position as shown in FIG. 7*c*.

Operation of the latch 10 is illustrated in FIGS. 7*a*-*c*, which show the latch installed on an aircraft door panel DP. FIG. 7*a* (along with FIGS. 1-4) shows the latch 10 oriented in the closed position. In this orientation, the latch bolt 14 is restrained in the closed position by a counterclockwise locking force exerted on the latch bolt 14 by the bolt actuator 16. In FIG. 7*a*, the locking force is illustrated by force vector LF. More specifically, the restraining arms 59 of the toggle linkage 53 exert a locking force LF on the first linkage pin 61, which is connected to the shank 14*a* of the latch bolt 14. That locking force LF exerts a counterclockwise moment on the latch bolt 14 about the proximal pivot pin 29, which causes the latch bolt 14 to rotate until the head 14*b* abuts the aircraft frame AF. The moment is in the counterclockwise direction because the force vector LF is skew to an over-center axis C between the second linkage pin 63 and the proximal pivot pin 29. The magnitude of the counterclockwise moment created by the locking force LF at the first pivot pin 29 is directly proportional to the angle theta (0) formed between the over-center axis C and the locking force vector LF as shown in FIG. 7*a*. More specifically, the magnitude of the locking force LF creating the counterclockwise moment is equal to the locking force LF multiplied by the sine of the angle theta (8) formed between the over-center axis and the locking force vector LF as shown in FIG. 7*a*. In this orientation, the greater the angle theta, the greater the clockwise force created by the internal pressure of the compartment on the latch bolt head 14*b* (or, alternatively, bumper 49) would be required to overcome the locking force LF. When the internal pressure of the compartment is equal to the atmospheric pressure outside the compartment, the clockwise force on the latch bolt head 14*b* (or, alternatively, bumper 49) is insufficient to overcome the counterclockwise moment at the first pivot pin 29 created by the locking force LF. In this orientation, the force on the latch bolt head 49 created by the internal pressure of the compartment is insufficient to overcome lock force LF.

As illustrated in FIG. 7*a*, the portion of the bumper 49 that traverses the phantom lines is meant to illustrate that the bumper 49 compresses because it is elastomeric. In preferred embodiments, the force of the bumper 49 does not cause any depression in the aircraft frame.

FIG. 7*b* shows the latch in a partially open position after the internal pressure created a force sufficient to overcome the locking force LF of the bolt actuator 16. More specifically, as the internal pressure on the door panel builds up, the force on the latch bolt head 14*a* increases to a critical point where the clockwise moment on the latch bolt 14 exceeds the counterclockwise moment of the locking force LF. When this occurs, the latch bolt 14 rotates clockwise causing the first linkage pin 61 to swing past the over-center axis C and the latch 10 unlocks. In this position, internal pressure is relieved through a gap between the door panel DP and the aircraft frame AF sufficient to avoid damage to the internal components.

When the first linkage pin 61 swings past the over-center axis C, the locking force LF of the bolt actuator 16 transitions from a counterclockwise moment to a clockwise moment until the first leg 67*a* disengages from the second linkage pin 63. After that point, the rotational force of the second torsion spring 69 continues to move the latch bolt to a more fully-open position shown in FIG. 7*c* wherein the latch bolt 14 is extending nearly perpendicular to the base 12. In this position, the door panel DP can be fully opened to allow a worker to access the internal components of the aircraft. The partially and fully open positions shown in FIGS. 7*b* and 7*c*, respectively, can also be achieved by prying the manual actuator arm 37 open from outside the door panel by using a work tool inserted in the slot 41 in the actuator head 39 to pull the manual actuator arm 37 out.

Referring to FIG. 7*c*, when the latch 10 is configured in the fully-open position, the head 39 of the manual actuator arm 37 protrudes from the door panel and is very visible, and remains highly visible until it is returned to the closed position. Therefore, even if the door panel DP is closed, the protruding head 39 serves as a visual safety indicator that the door panel DP is not secured.

It will be readily understood by those in the mechanical arts that the dimensions of the various components of the invention can be selected to operate as described above without limitation to the particular configuration, proportions and dimensions shown in the preferred embodiment.

As such, the invention is to be defined only by the following claims and their legal equivalents.

The invention claimed is:

1. A pressure-release latch comprising:

a base configured to be mounted to a panel that is hingedly coupled to a frame;

a bracket extending from a side of the base, the bracket having opposed first and second planar surfaces and an edge surface extending between the first and second planar surfaces, the bracket including:

a capture slot extending through the first and second planar surfaces; and a threaded bore extending from the edge surface of the capture slot;

a latch bolt coupled to the side of the base and movable between a first position, in which the latch bolt is configured to lock the panel in a position relative to the frame, and a second position, in which the latch bolt is configured to allow the panel to move relative to the frame;

a spring-biased toggle-linkage tensioner including:

a restraining arm pivotally coupled to the latch bolt using a first linkage pin;

a lever arm having a proximal end pivotally connected to the restraining arm by a second linkage pin and a distal end pivotally mounted to the base by a pivot pin; and a torsion spring that biases the lever arm and the restraining arm towards a first end of the latch bolt, the torsion spring being wound around the pivot pin and having first and second radiating legs, the first radiating leg contacting at least one of the first and second linkage pins when the latch bolt is in the first position, the second radiating leg being received by the capture slot; and a calibration mechanism that is adjustable to calibrate a magnitude of an opening force required to automatically move the latch bolt from the first position to the second position, the calibration mechanism including:

a calibration screw that is extendable into and retractable from the capture slot via the threaded bore, the calibration screw having an end abutting a portion of the second radiating leg disposed within the capture slot such that movement of the calibration screw within the capture slot when the pressure-release latch is in the first position changes a degree of deflection of the torsion spring from its free position.

2. The pressure-release latch of claim 1, wherein the pressure-release latch further includes:

an actuator arm coupled to the latch bolt and extending from the latch bolt through a central aperture of the base and configured to move the latch bolt between the first position and the second position when a manual force is applied to the actuator arm.

3. The pressure-release latch of claim 2, wherein the actuator arm includes an actuator arm head formed at a free end away from the latch bolt, the actuator arm being configured to sit flush within the panel when the pressure-release latch is in the first position and to extend outwardly transverse to the panel when the pressure-release latch is in the second position.

4. The pressure-release latch of claim 1, wherein the pivot pin is a first pivot pin, the latch bolt is coupled to the base using a second pivot pin, the torsion spring is a first torsion spring, and the spring-biased toggle-linkage tensioner further includes:

a second torsion spring wrapped around the second pivot pin that biases the latch bolt toward the second position.

5. The pressure-release latch of claim 1, wherein the restraining arm is a first restraining arm, and the spring-biased, toggle-linkage tensioner further includes:

a second restraining arm, the first and second restraining arms being mounted on opposite sides of the lever arm.

6. The pressure-release latch of claim 1, wherein a head of the latch bolt is configured to abut the frame when the latch bolt is in the first position.

7. The pressure-release latch of claim 6, wherein the pressure-release latch further includes:

a bumper fixed to the head of the latch bolt, the bumper including an elastomeric material.

8. The pressure-release latch of claim 6, wherein the latch bolt moves to the second position when the opening force on the head of the latch bolt rotates the latch bolt and urges the spring-biased toggle-linkage tensioner from a first angular configuration to a linear configuration; and from the linear configuration to an opposed second angular configuration.

9. The pressure-release latch of claim 1, wherein the pivot pin is a first pivot pin, the latch bolt is coupled to the base using a second pivot pin, the second linkage pin defines an over-center axis, the spring-biased toggle-linkage tensioner being configured so that the second linkage pin is out of alignment with the over-center axis in the first position.

10. The pressure-release latch of claim 9, wherein the first linkage pin rotates past the over-center axis to move the latch bolt from the first position to the second position when pressure on the latch bolt exceeds the opening force.

11. The pressure-release latch of claim 9, wherein the restraining arm and the first and second linkage pins together define a toggle linkage and rotation of the first linkage pin past the over-center axis releases all restraining force of the toggle linkage on the latch bolt.

12. The pressure-release latch of claim 11, wherein a moment exerted by the spring-biased toggle-linkage tensioner on the latch bolt reverses direction when the toggle linkage rotates and the first linkage pin crosses the over-center axis.

13. The pressure-release latch of claim 1, wherein the threaded bore and the calibration screw are oriented at a non-zero angle relative to the portion of the second radiating leg disposed within the capture slot.

14. The pressure-release latch of claim 1, wherein the torsion spring has a first diameter and the calibration screw has a second diameter that is less than the first diameter.

15. The pressure-release latch of claim 1, wherein the capture slot includes a top end and a bottom end, the bottom end is nearer to the base than the top end, and the calibration screw changes the degree of deflection of the torsion spring by changing the position of the second radiating leg relative to the bottom end of the capture slot.

16. The pressure-release latch of claim 15, wherein the capture slot has an arcuate shape such that the capture slot allows the second radiating leg to travel through an arc-shaped path as the calibration screw changes the position of the second radiating leg relative to the bottom end of the capture slot.

17. A pressure-release latch comprising:

a base configured to be mounted to panel that is hingedly coupled to a frame;

first and second brackets extending from a side of the base, the first and second brackets each having opposed first and second planar surfaces and an edge surface extending between the first and second planar surfaces, the first and second brackets each including:

a capture slot extending through from the first and second planar surfaces; and a threaded bore extending from the edge surface to the capture slot;

a latch bolt coupled to the base and being movable between a first position, in which the latch bolt is configured to lock the in position relative to the frame, and a second position, in which the latch bolt is configured to allow the door panel to be move relative to the frame;

a torsion spring that is configured to bias the latch bolt toward the first position and to automatically move the latch bolt from the first position to the second position when an opening force is applied to the latch bolt; and a calibration mechanism that calibrates a magnitude of the opening force, the calibration mechanism including:

a calibration screw extendable into and retractable from the capture slot via the threaded bore, the calibration screw having an end abutting a portion of the torsion spring received by the capture slot such that movement of the calibration screw within the capture slot when the pressure-release latch is in the first position changes a biasing force of the torsion spring.

18. The pressure-release latch of claim 17, wherein the capture slot of the first bracket is in line with the capture slot of the second bracket.

19. A pressure-release latch comprising:

a base configured to be mounted to a panel that is hingedly coupled to a frame;

a bracket extending from a side of the base, the bracket having opposed first and second side surfaces and opposed top and bottom edges, the bottom edge being coupled to the base, the bracket including:

a capture slot extending through the first and second side surfaces of the bracket, and a threaded bore extending from the top edge of the bracket to the capture slot;

a latch bolt mounted on the base and movable between a first position, in which the latch bolt is configured to lock the panel in position relative to the frame, and a second position, in which the latch bolt is configured to allow the panel to move relative to the frame;

a spring-biased, toggle-linkage tensioner connected to the base and the latch bolt and configured to exert a lock force on the latch bolt to maintain the latch bolt in the first position and to automatically move the latch bolt to the second position when an opposed force in excess of the lock force is exerted on the latch bolt, the spring-biased toggle-linkage tensioner having a first end pivotally coupled to the base and a second end pivotably coupled to the latch bolt, the spring-biased toggle-linkage tensioner including:

a restraining arm pivotally coupled to the latch bolt by a first linkage pin;

a lever arm having a proximal end pivotally connected to the restraining arm by a second linkage pin and a distal end pivotally mounted to the base by a pivot pin; and a torsion spring that biases the lever arm and the restraining arm to urge the latch bolt toward the first position, the torsion spring being wound around the pivot pin and having first and second radiating legs, the first radiating leg contacting at least one of the first and second linkage pins when the latch bolt is in the first position, the second radiating leg being received by the capture slot; and a calibration screw extendable into and retractable from the capture slot via the threaded bore, the calibration screw having an end abutting a portion of the second radiating leg disposed within the capture slot such that movement of the calibration screw within the capture slot when the pressure-release latch is in the first position changes a biasing force of the torsion spring.

20. The pressure-release latch of claim 19, wherein the portion of the second radiating leg disposed within the capture slot is parallel with the side of the base.

* * * * *